Patented Oct. 16, 1934

1,976,961

UNITED STATES PATENT OFFICE 1,976,961

PROCESS OF PREPARING AND PACKING PRUNES

Clifford B. Pape, San Jose, Calif., assignor to California Prune & Apricot Growers Association, San Jose, Calif., a corporation of California No Drawing. Application August 22, 1932, Serial No. 629,997

4 Claims. (Cl. 99—11)

This invention relates to a new process of preparing and packing dried fruits such as prunes.

The principal object of this invention is the provision of a process and method of handling prunes and other dried fruits in such a manner as to obtain a sterile product in a sterile container. It is significant to note that this result has heretofore been obtained only in the canning art, that is the sealing of fruits in a tin can or glass jar along with a quantity of free liquids, with which art the present invention is not to be confused.

The invention also has for an object the treatment of prunes in such a manner as to preserve many of the natural attributes of the fruit and to provide the consumer with a tender product not requiring any great amount of preparation before consumption.

A further object of the invention is to provide a process for the treatment of prunes whereby the latter may be stored for extended periods of time without danger of becoming moldy, fermenting, or the development of internal infestation.

Another object of this invention is the provision of a process whereby excessive drying and resulting toughness of the prune can be avoided and to produce fruit which will maintain a uniform standard so that one recipe can be followed in final preparation for consumption without regard to the climatic conditions under which the product has been previously stored and without regard to the climatic conditions prevailing at the time of purchase.

It is a known fact that under natural conditions prunes contain very little moisture and that this desirable amount is quickly lost when the fruit is packed under the prevailing methods. It is also known that prunes processed and packed under the prevailing methods must be stored in a cool place, particularly during the summer months, in order to prevent spoilage. Spoilage of prunes packed in accordance with known methods has resulted from one of four conditions, namely: sugaring, mold, fermentation or internal infestation. Sugaring results from the drying out of prunes so processed. Mold and fermentation result from the exposure of such prunes. Internal infestation results from exposure to contamination prior to the actual closing of the package.

Therefore, another object of this invention is to provide a process under which a sterile product is obtained to avoid the disastrous results of molding, fermenting, sugaring and internal infestation.

Briefly, the process forming the subject matter of this invention consists of the following steps. The prunes are first run through a wash of warm water, being completely immersed therein, which tends to dislodge most of the dirt and microorganisms infecting all natural fruit. This washing step also prepares the fruit for the next treatment in which boiling water is used, in that the temperature of the fruit is moderately raised and the pores of the prune are opened to permit easy action thereon by the said boiling water.

The next step in my process is to immerse the washed fruit in water which is definitely maintained at a boiling point (212° F.) through the use of live steam kept under sufficient pressure to insure that the temperature of the fruit itself is uniformly brought as near to the boiling point as possible. During the treatment provided in this step the prunes receive a partial cooking and complete sterilization, the former enabling the consumer to more quickly prepare the fruit for consumption and producing a fruit which is more palatable and digestible.

The third step consists in passing the fruit over a shaker mechanism to remove the surplus moisture accumulated during the second step preparatory to packaging the fruit. It is essential that the shaker mechanism employed be completely covered to insure that the temperature of the individual prune is maintained as nearly as high as it was upon leaving the precooker, since the successful practice of this process requires that the fruit shall be packed while still hot enough to be sterile. Experiments have taught that best results are obtained when the interior of the package registers an average temperature of 165° F. at the time it is to be closed about the fruit.

The prunes, still under cover for the reasons above given, pass from the shaker mechanism to a suitable hopper from which they are discharged into the carton or package. It should be noted that the successful practice of this invention does not depend upon the use of a carton or package of any special design, but it has been found that the package employed should be air-tight and moisture proof, not only to prevent loss of moisture through evaporation, but entry of any destructive organisms.

It will thus be seen that when the fruit is placed in the package the temperature of each individual prune is sufficiently high to maintain the sterility thereof and also to produce sterility within the carton. The temperature of the mass of prunes is sufficient to raise that of the interior of the carton and produce a permanent sterile condition, inasmuch as the carton is sealed immediately after being filled with the hot prunes.

An important feature of this invention is the fact that the temperature of the individual prune is gradually raised to a near boiling point and the fruit is transmitted to the package while still very hot. This is the direct opposite of the prevailing methods in which, after a preliminary cooking step, it is the custom to cool the prunes as quickly as possible preparatory to the packaging of same.

The practice of this process insures a sterile, tender product, containing a definite amount of moisture and having many of the natural attributes of the fruit. It further produces a packaged prune which is maintained in a definite and satisfactory condition without special care or handling. Also the prunes processed in accordance with the present invention may be readily prepared by the housewife simply and efficiently even after being stored for long periods of time.

It is to be understood that the use of the term "prunes" throughout the specification and claims is not to be regarded as an indication that the process forming the subject matter of this invention is specifically limited in applicability to that particular fruit, for the invention may be practiced as to other varieties of fruits as well as edible products of the soil, vine, orchard or grove.

Having thus described my invention, what I claim and desire to secure by Letters Patent is:

1. The process of packing prunes comprising washing the fruit in warm water, subjecting the washed fruit to the action of boiling water, removing the excess surface moisture from the fruit while maintaining the same at a high temperature, and packaging the fruit in an airtight container while still hot.

2. The process of packing prunes comprising washing the fruit in warm water, subjecting the fruit to a partial cooking, removing excess surface moisture from and packaging the fruit in airtight carton containers while maintaining the same at a sterilizing temperature.

3. The process of preparing and packing prunes comprising washing the fruit, partially cooking and completely sterilizing the fruit by subjecting the same to the action of boiling water and packaging the fruit in airtight containers while still sufficiently hot to insure sterility of the fruit and to obtain sterilization of the interior of the package.

4. The process of packing prunes comprising washing the fruit in warm water, boiling the fruit and then removing substantially all surface moisture from it and packaging it in cartons without letting the temperature of the fruit drop below 165° F.

CLIFFORD B. PAPE.